United States Patent [19]
Aida et al.

[11] Patent Number: 5,335,351
[45] Date of Patent: Aug. 2, 1994

[54] METHOD FOR OPTIMIZING SOURCE PROGRAM INCLUDING VARIABLES NECESSARY FOR SYNCHRONOUS/EXCLUSIVE CONTROL

[75] Inventors: Kazuhiro Aida; Eiji Nunohiro, both of Yokohama; Hiroyuki Sone, Hiratsuka, all of Japan

[73] Assignees: Hitachi, Ltd., Tokyo; Hitachi Software Engineering Co., Ltd., Yokohama, both of Japan

[21] Appl. No.: 883,375

[22] Filed: May 15, 1992

[30] Foreign Application Priority Data

May 21, 1991 [JP] Japan ................................. 3-115858

[51] Int. Cl.$^5$ .............................................. G06F 9/45
[52] U.S. Cl. ............................. 395/700; 364/DIG. 1; 364/280.5; 364/271
[58] Field of Search ................ 364/200 MS File; 395/650, 700

[56] References Cited
U.S. PATENT DOCUMENTS

| | | | |
|---|---|---|---|
| 4,802,091 | 1/1989 | Cocke et al. | 364/DIG. 1 |
| 4,843,545 | 6/1989 | Kikuchi | 364/DIG. 1 |
| 5,146,594 | 9/1992 | Iitsuka | 364/DIG. 1 |

OTHER PUBLICATIONS

"PCF Fortran Language Definition", The Parallel Computing Forum, 1988, pp. 23-30.

*Primary Examiner*—Thomas M. Heckler
*Attorney, Agent, or Firm*—Antonelli, Terry, Stout & Kraus

[57] ABSTRACT

In optimization processing performed by a compiler to execute a source program described in a high level language on the environment of a multiprocessor system, a judgment is made at the time of compiling as to whether or not there is any objective equation over an executable statement for synchronous/exclusive control. When a decision is made in this judgment that there is the objective equation over executable statement for synchronous/exclusive control, data flow analysis is performed on variables necessary for synchronous/exclusive control, thereby making a judgment as to whether the objective equation for optimization includes at least one variable necessary for synchronous-/exclusive control. When the objective equation includes no variable necessary for synchronous/exclusive control, optimization processing is performed over the executable statement for synchronous/exclusive control.

8 Claims, 2 Drawing Sheets

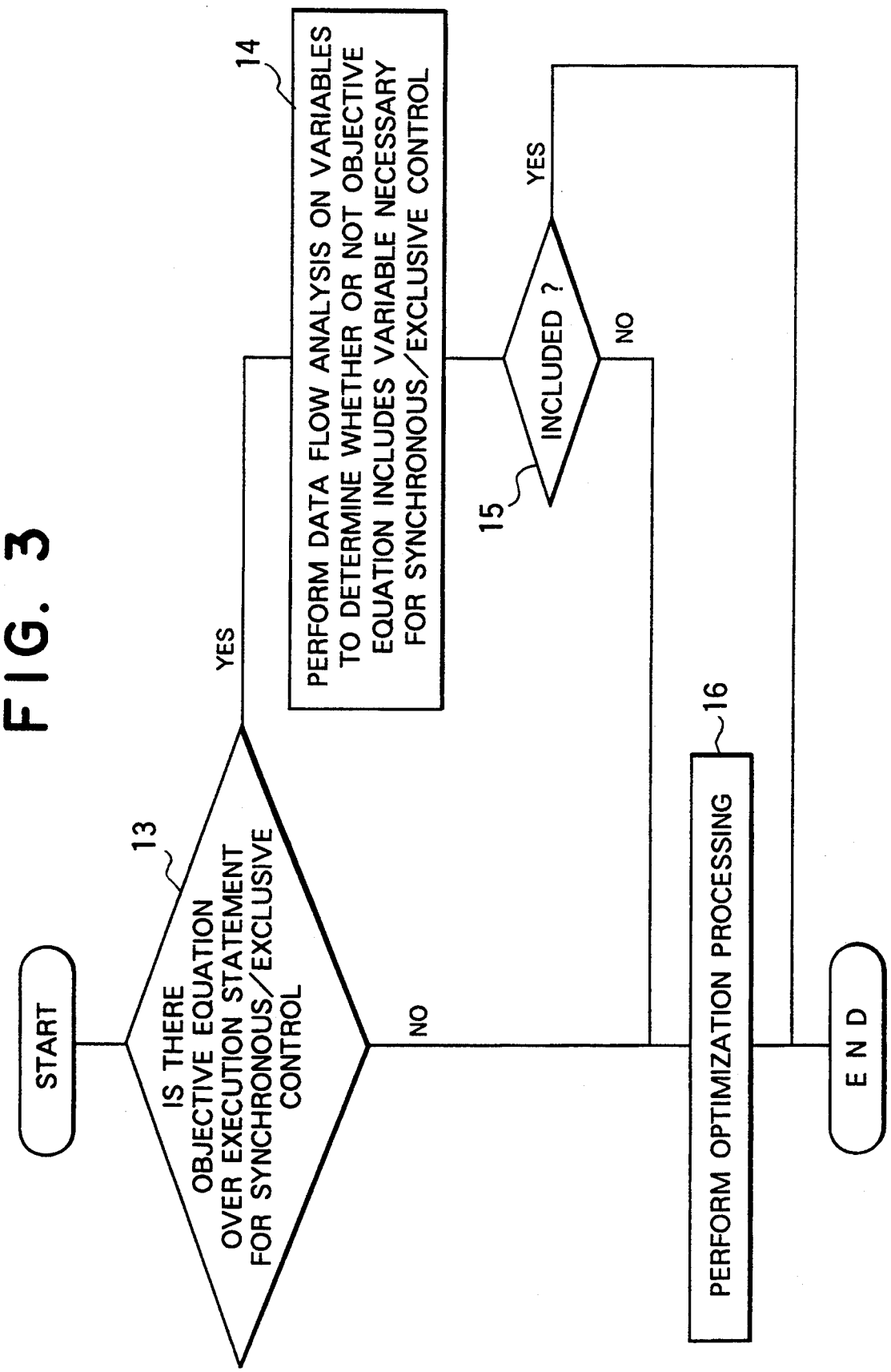

METHOD FOR OPTIMIZING SOURCE PROGRAM INCLUDING VARIABLES NECESSARY FOR SYNCHRONOUS/EXCLUSIVE CONTROL

BACKGROUND OF THE INVENTION

1. Field of the Invention

The present invention relates to a method for optimizing a program for a multiprocessor system, and particularly relates to a method for generating an object program efficiently executed on a multiprocessor system, from a source program described in a high level language.

2. Description of the Related Art

To efficiently execute a source program described in a high level language on the environment of a multiprocessor system, an executable statement for synchronous/exclusive control needs to be manipulated for optimization processing by a compiler. Heretofore, a method for designating the executable statement for synchronous/exclusive control has been described in the reference, "The Parallel Computing Forum (1988)", pp. 23–30, PCF Fortran: Language definition.

In the conventional method, however, there is nothing but designation of the range of a portion of a source program to be subjected to synchronous/exclusive control in a multiprocessor system. Accordingly, there arises a problem in that the performance of execution of the program is deteriorated because optimization processing such as replacement of a common equation by a variable is suppressed in compiling even in the case where there is any executable statement irrelative to synchronous/exclusive control in the designated range.

SUMMARY OF THE INVENTION

An object of the present invention is to provide a method for generating an object program in which the execution time thereof can be minimized in the case where the synchronous/exclusive control needs to be performed on a program for a multiprocessor system, thereby solving the aforementioned problem.

In order to achieve the foregoing object of the present invention, there is provided a method for generating an object program, which includes the steps of:

making a first judgment as to whether or not a source program includes any objective equation over an executable statement for synchronous control;

making a second judgment as to whether or not each variable used in the objective equation is necessary for the synchronous control when it is determined that the source program includes the objective equation; and optimizing the source program when it is determined in the first judgment that the source program includes no objective equation or when it is determined in the second judgment that each variable used in the objective equation is not necessary for synchronous control.

According to the present invention, optimization processing is performed on the basis of the judgment as to whether or not the objective equation for the optimization is necessary for synchronous/exclusive control. Therefore, program execution efficient for performance of synchronous/exclusive control can be provided.

BRIEF DESCRIPTION OF THE DRAWINGS

FIG. 3 is a flow chart for explaining the optimization processing method according to the present invention.

DESCRIPTION OF THE PREFERRED EMBODIMENTS

The optimizing method according to the present invention will be described hereunder in detail with reference to the accompanying drawings.

First the concept of the present invention will be described. In an executable statement for synchronous/exclusive control, variables indicating the correspondence between processors necessary for synchronous/exclusive control and variables necessary for synchronous/exclusive control are designated.

When optimization processing such as replacement of a common equation by a new variable is performed, a compiler judges from information of data flow analysis on variables whether or not each variable in an equation is necessary for synchronous/exclusive control. When the variable is necessary for synchronous/exclusive control, an object program not subjected to the optimization processing over an executable statement for synchronous/exclusive control is generated. When the variable is not necessary for synchronous/exclusive control, an object program subjected to the optimization processing such as replacement of the common equation by the new variable over the executable statement for synchronous/exclusive control is generated.

Thus, because variables indicating the correspondence between the processors necessary for synchronous/exclusive control and the variables necessary for synchronous/exclusive control are designated in the executable statement for synchronous/exclusive control, the compiler can judge whether or not each variable in the objective equation for optimization is necessary for synchronous/exclusive control. On the basis of the result of the judgment, optimization over the executable statement for synchronous/exclusive control with respect to the variable unnecessary for synchronous/exclusive control can be made without any suppression. Because each variable necessary for synchronous/exclusive control in a program for a multiprocessor system is designated as described above, execution performance at the time of the executing of the program is improved relatively greatly compared with the conventional method in which no variable but variables indicating the correspondence between processors for synchronous/exclusive control can be designated.

Figure 1:
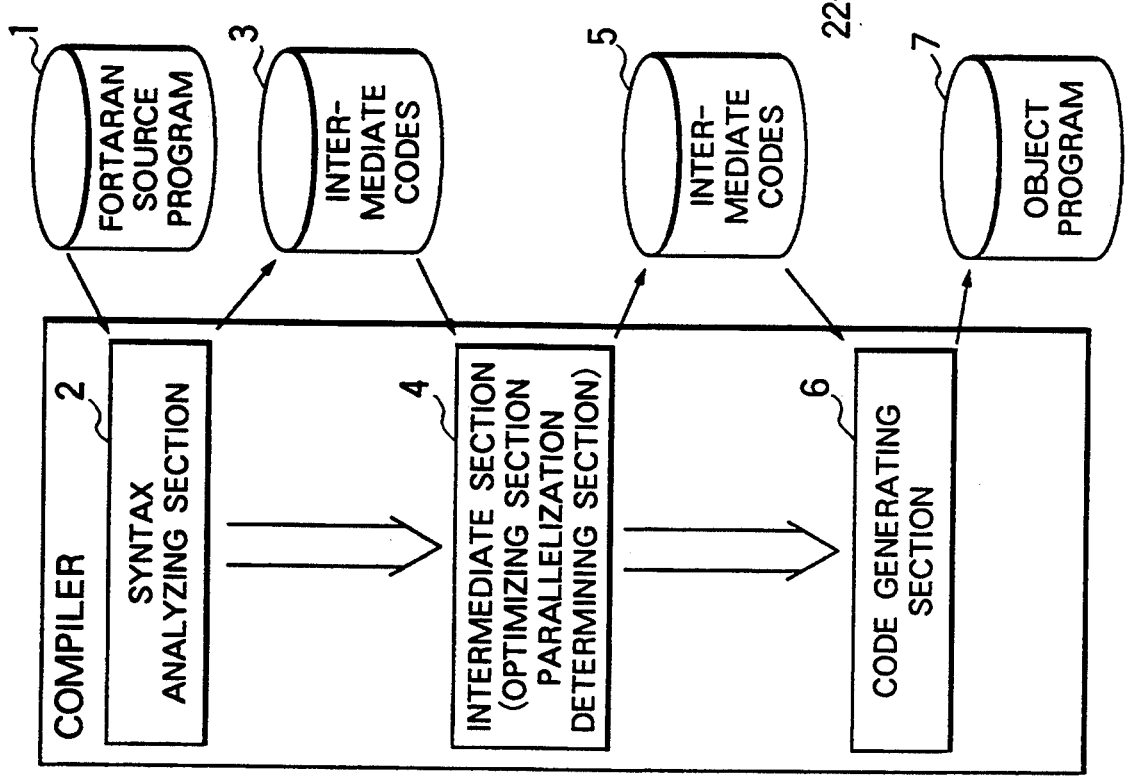
FIG. 1 is a configuration diagram of the whole of a compiler according to an embodiment of the present invention.
Figure 2:
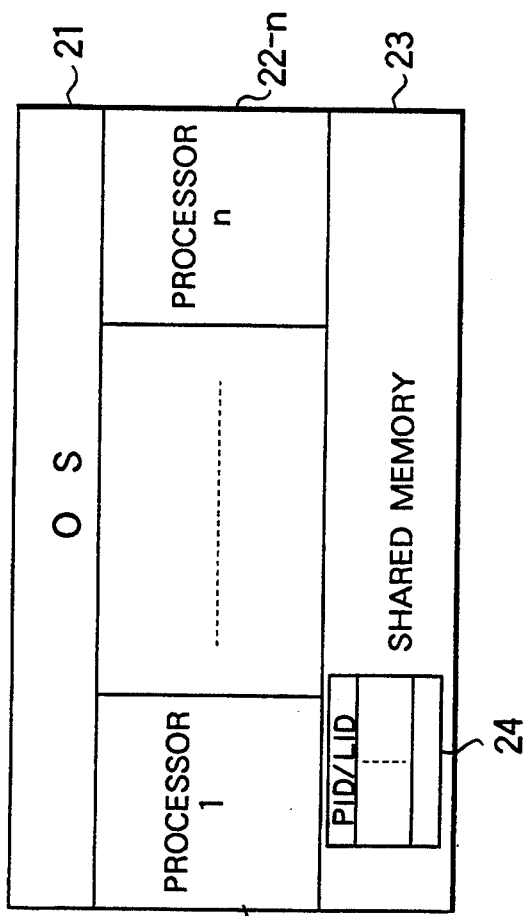
FIG. 2 is a diagram showing a firmware of a multiprocessor system in which a load module is executed.

The firmware of a multiprocessor system in which an object program generated by the optimizing method according to the present invention is executed will be described hereunder with reference to FIG. 2. A number, n, of processors 22-1 to 22-n operates on an operating system (OS) used in common thereto. A shared memory 23 for all the processors includes a PID/LID area 24. At least one variable PID for synchronous/exclusive control is stored in the PID/LID area 24.

The whole configuration of a compiler including the optimization processing according to the present invention will be described hereunder with reference to FIG.

1. The compiler includes a syntax analyzing section 2, an intermediate section 4, and a code generating section 6. The intermediate section 4 includes an optimizing section related to the present invention, and a parallelization determining section.

The syntax analyzing section 2 supplied with a source program performs syntax analysis to generate intermediate codes 3.

The intermediate section 4 supplied with the intermediate codes 3 performs control flow analysis and data flow analysis and then performs analysis of the dependency of variables, arrays and array subscripts to determine as to whether or not optimization/parallelization can be made, thereby generating intermediate codes 5.

The code generating section 6 supplied with the intermediate codes 5 allocates storage areas and registers and generates an executable object program 7.

The optimizing method according to the present invention will be described hereunder with reference to FIG. 3.

A FORTRAN source program 1 on an external storage is supplied to the syntax analyzing section 2, in which the source program is converted into intermediate codes 3. The intermediate codes 3 on the external storage are supplied to the intermediate section 4, in which processing, such as determination processing as to whether parallelization can be made, optimization processing, etc., is performed.

The optimization processing is shown in FIG. 3. In a step 13, a judgment is made in compiling by syntax analysis as to whether or not an objective equation for the optimization processing is in a program range over an executable statement for synchronous/exclusive control. When the objective equation is in a range over the executable statement for synchronous/exclusive control, data flow analysis in a step 14 is performed on variables necessary for synchronous/exclusive control to determine in a step 15 whether or not the objective equation for optimization includes any variable necessary for synchronous/exclusive control. When the objective equation for optimization includes no variable necessary for synchronous/exclusive control, optimization processing in a step 16 is performed in a range over the executable statement for synchronous/exclusive control. When the objective equation includes any variable necessary for synchronous/exclusive control, such optimization processing in a range over the executable statement for synchronous/exclusive control is not performed.

| Example 1 | |
|---|---|
| c1 = a + b | (8-1) |
| c2 = a + b + d | (8-2) |
| T1 = a + b | (9-1) |
| c1 = T1 | (9-2) |
| c2 = T1 + d | (9-3) |
| Example 2 | |
| c1 = a + b | (10-1) |
| POST(PID,d) | (10-2) |
| c2 = a + b + d | (10-3) |
| T1 = a + b | (11-1) |
| c1 = T1 | (11-2) |
| POST(PID,d) | (11-3) |
| c2 = T1 + d | (11-4) |

The specific optimizing operation in the present invention will be described hereunder in conjunction with the examples 1 and 2 of FORTRAN source programs. In the example 1, addition of variables a and b is common to equations 8-1 and 8-2 in a program portion 8 (8-1, 8-2) of the FORTRAN source program. Accordingly, the program portion 8 is optimized by the compiler so as to be converted into a program portion 9 (9-1, 9-2, 9-3). In the example 2, a program portion 10 includes calculation equations 10-1 and 10-3 and an executable statement 10-2 for synchronous control. In the statement 10-2, a variable PID indicating the correspondence between processors or processes for synchronous control and a variable d necessary for synchronous control are designated. These are written by a programmer in advance at the time producing the program.

In the example 2, addition of variables a and b is common to the equations 10-1 and 10-3 in the program portion 10. Accordingly, the common addition is considered as an object of optimization processing. In the step 13, a decision is made that the equation 10-1 is an equation subjected to optimization processing over the executable statement 10-2 for synchronous control. From information of data flow analysis on the variable d necessary for synchronous control in the step 14, a decision is made by the judgment in the step 15 that the equation 10-1 includes no variable necessary for synchronous control. As a result, in the step 16, optimization processing till the equation 10-1 is performed over the executable statement 10-2 for synchronous control, so that the program portion 10 is converted into a program portion 11.

The case of exclusive control will be described with reference to the following example 3.

| Example 3 | |
|---|---|
| C = P1.P2 | (12-1) |
| LOCK(LID,GSUM) | (12-2) |
| GSUM = GSUM + P1.P2 | (12-3) |
| UNLOCK(LID,GSUM) | (12-4) |
| T = P1.P2 | (13-0) |
| C = T | (13-1) |
| LOCK(LID,GSUM) | (13-2) |
| GSUM = GSUM + T | (13-3) |
| UNLOCK(LID,GSUM) | (13-4) |

The case where the total sum with respect to a variable GSUM is calculated while program statements 12-2 and 12-4 in which a variable LID for exclusive control (that is, a variable indicating the correspondence for exclusive control) is designated are exclusively controlled, will be described with reference to the example 3 in which programs are executed in parallel.

P1·P2 is a calculation equation common to program statements 12-1 and 12-3. In the program statements 12-2 and 12-4, each of P1 and P2 is not designated as a variable necessary for exclusive control. Accordingly, the equation C=P1·P2 is determined to be an objective equation for optimization processing over the program statement for exclusive control.

When a program statement 13-2 is executed but there is no exclusive control with respect to the variable GSUM, that is, when a flag for the PID/LID area for the synchronous/exclusive control is off, a program statement 13-3 is executed after the flag for the PID/LID area is turned on. When, on the contrary, exclusive control is performed with respect to the variable GSUM, the program statement 13-3 is not executed before the flag for the PID/LID area for the synchronous/exclusive control is turned off. When the execution of the program statement 13-3 is terminated, the flag for the PID/LID area for the synchronous/exclusive control is turned off on the basis of a program statement 13-4.

What is claimed is:

1. A method for generating an object program from a source program for a multiprocessor system, the method being executed by a computer and comprising the steps of:

making a first judgment to determine whether said source program includes equations each of which performs a same calculation and whether said equations are in a range near an executable statement for synchronous control in said source program;

making a second judgment to determine whether each one of a plurality of variables used in said same calculation is necessary for synchronous control when it is determined by said first judgment that said source program includes said equations; and optimizing said source program by performing said same calculation once and using results of said same calculation in each of said equations when it is determined by said first judgment that said equations are not in a range near the executable statement for synchronous control or when it is determined by said second judgment that each one of said variables used in said same calculation is not necessary for synchronous control.

2. A method according to claim 1, wherein at least one variable necessary for synchronous control is written in the executable statement for synchronous control.

3. A method according to claim 2, wherein said first judgment is made by syntax analysis of said source program based on the executable statement for synchronous control.

4. A method according to claim 2, wherein said step of making a second judgment comprises the step of judging whether or not each one of said variables used in said same calculation is equivalent to said at least one variable written in the executable statement for synchronous control.

5. A method for generating an object program from a source program for a multiprocessor, the method being executed by a computer and comprising the steps of:

making a first judgment to determine whether said source program includes equations each of which performs a same calculation and whether said equations are in a range near an executable statement for exclusive control in said source program;

making a second judgment to determine whether each one of a plurality of variables used in said same calculation is necessary for exclusive control when it is determined by said first judgment that said source program includes said equations; and optimizing said source program by performing said same calculation once and using results of said same calculation in each of said equations when it is determined by said first judgment that said equations are not in a range near the executable statement for synchronous control or when it is determined by said second judgment that each one of said variables used in said same calculation is not necessary for exclusive control.

6. A method according to claim 5, wherein at least one variable necessary for exclusive control is written in the executable statement for exclusive control.

7. A method according to claim 6, wherein said first judgment is made by syntax analysis of said source program based on the executable statement for exclusive control.

8. A method according to claim 6, wherein said second judgment step comprises the step of judging whether or not each one of said variables used in said same calculation is equivalent to said at least one variable written in the executable statement for exclusive control.

* * * * *